US012697973B2

(12) United States Patent
Tanaka

(10) Patent No.: US 12,697,973 B2
(45) Date of Patent: Aug. 4, 2026

(54) VEHICLE AUTOMATIC DECELERATION CONTROL DEVICE

(71) Applicant: TOYOTA JIDOSHA KABUSHIKI KAISHA, Toyota (JP)

(72) Inventor: Yusuke Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 18/072,017

(22) Filed: Nov. 30, 2022

(65) Prior Publication Data

US 2023/0211783 A1     Jul. 6, 2023

(30) Foreign Application Priority Data

Jan. 14, 2022     (JP) ................................. 2022-004379

(51) Int. Cl.
*B60W 30/18*          (2012.01)
*B60Q 1/44*           (2006.01)
*B60W 40/08*          (2012.01)

(52) U.S. Cl.
CPC ......... *B60W 30/18109* (2013.01); *B60Q 1/44* (2013.01); *B60W 40/08* (2013.01); *B60W 2554/80* (2020.02)

(58) Field of Classification Search
CPC ....... B60Q 1/44; B60Q 1/46; B60W 2540/26; B60W 2552/05; B60W 2554/80; B60W 2720/106; B60W 30/18109; B60W 40/08; B60W 60/001; B60Y 2302/05
See application file for complete search history.

(56) References Cited

U.S. PATENT DOCUMENTS

| | | | | |
|---|---|---|---|---|
| 11,186,288 B1 * | 11/2021 | Chan | ...................... | B60W 40/08 |
| 11,404,075 B1 * | 8/2022 | Lakhani | .................. | G10L 25/51 |
| 11,648,940 B2 * | 5/2023 | Mizoguchi | ........ | B60W 60/0051 |
| | | | | 701/23 |
| 2004/0014565 A1 * | 1/2004 | Oshima | ................. | F02D 41/123 |
| | | | | 477/182 |
| 2009/0027212 A1 * | 1/2009 | Nakagoshi | ............. | G08B 21/06 |
| | | | | 340/575 |
| 2009/0037070 A1 * | 2/2009 | Nakamura | .......... | B60W 40/072 |
| | | | | 701/96 |

(Continued)

FOREIGN PATENT DOCUMENTS

| | | | | |
|---|---|---|---|---|
| CN | 102971175 A | 3/2013 | | |
| EP | 1362735 A2 * | 11/2003 | ......... | B60K 31/0058 |

(Continued)

*Primary Examiner* — Babar Sarwar
(74) *Attorney, Agent, or Firm* — Sughrue Mion, PLLC

(57)          ABSTRACT

A vehicle automatic deceleration control device includes a driver imaging camera as a driver state detection device that detects a state of a driver and a control unit that automatically decelerates a vehicle at a predetermined deceleration to stop the vehicle by controlling a brake device when the driver is detected to be in a state in which the driver is unsuitable for driving. The control unit is configured to determine whether a road on which the vehicle is traveling is a motorway, set the predetermined deceleration to a first deceleration when the road is determined to be the motorway, and set the predetermined deceleration to a second deceleration that is higher than the first deceleration when the road is determined not to be the motorway.

3 Claims, 5 Drawing Sheets

(56)          References Cited

U.S. PATENT DOCUMENTS

| | | | | |
|---|---|---|---|---|
| 2012/0072243 A1* | 3/2012 | Collins | | G06Q 10/10 |
| | | | | 705/4 |
| 2013/0018549 A1* | 1/2013 | Kobana | | B60K 28/06 |
| | | | | 701/41 |
| 2013/0314503 A1* | 11/2013 | Nix | | G06V 20/58 |
| | | | | 348/46 |
| 2016/0086393 A1* | 3/2016 | Collins | | A61B 5/024 |
| | | | | 701/31.5 |
| 2017/0072926 A1* | 3/2017 | Fukuda | | B60T 8/1755 |
| 2017/0106858 A1* | 4/2017 | Li | | B60W 30/09 |
| 2017/0297567 A1* | 10/2017 | Matsumura | | B60W 40/08 |
| 2018/0037112 A1* | 2/2018 | Otake | | B60W 10/182 |
| 2019/0049959 A1* | 2/2019 | Gaither | | B60W 50/085 |
| 2019/0072957 A1* | 3/2019 | Fujimura | | B60W 50/14 |
| 2019/0092321 A1* | 3/2019 | Shimizu | | B60W 40/08 |
| 2019/0129416 A1* | 5/2019 | Upmanue | | G05D 1/0061 |
| 2019/0143990 A1* | 5/2019 | Kim | | B60W 50/10 |
| | | | | 701/27 |
| 2019/0213429 A1* | 7/2019 | Sicconi | | G06F 3/012 |
| 2019/0272744 A1* | 9/2019 | Suzuki | | G08G 1/167 |
| 2020/0070825 A1* | 3/2020 | Sugano | | B60W 40/08 |
| 2020/0070848 A1* | 3/2020 | Ozer | | B60W 30/10 |
| 2020/0133264 A1* | 4/2020 | Matsunaga | | G05D 1/0055 |
| 2021/0016783 A1* | 1/2021 | Watanabe | | B60W 30/18154 |
| 2021/0276550 A1* | 9/2021 | Gotou | | G08G 1/16 |
| 2022/0144274 A1* | 5/2022 | Kudo | | B60W 10/18 |
| 2022/0172295 A1* | 6/2022 | Grandy | | G06Q 40/08 |
| 2023/0399013 A1* | 12/2023 | Kume | | B60W 30/162 |

FOREIGN PATENT DOCUMENTS

| | | | | | |
|---|---|---|---|---|---|
| EP | 3974277 A1 * | 3/2022 | | | B60W 30/16 |
| JP | 2004034938 A * | 2/2004 | | | |
| JP | 2004196102 A * | 7/2004 | | | |
| JP | 2010-9607 A | 1/2010 | | | |
| JP | 2014088160 A * | 5/2014 | | | |
| JP | 2017-190048 A | 10/2017 | | | |
| JP | 2021-014232 A | 2/2021 | | | |
| JP | 2021-165070 A | 10/2021 | | | |
| JP | 7517221 B2 * | 7/2024 | | | B60W 10/06 |
| WO | WO-2019008649 A1 * | 1/2019 | | | B60W 30/00 |
| WO | 2019/069448 A1 | 4/2019 | | | |
| WO | WO-2022140660 A1 * | 6/2022 | | | B60T 7/22 |

* cited by examiner

Figure 4:
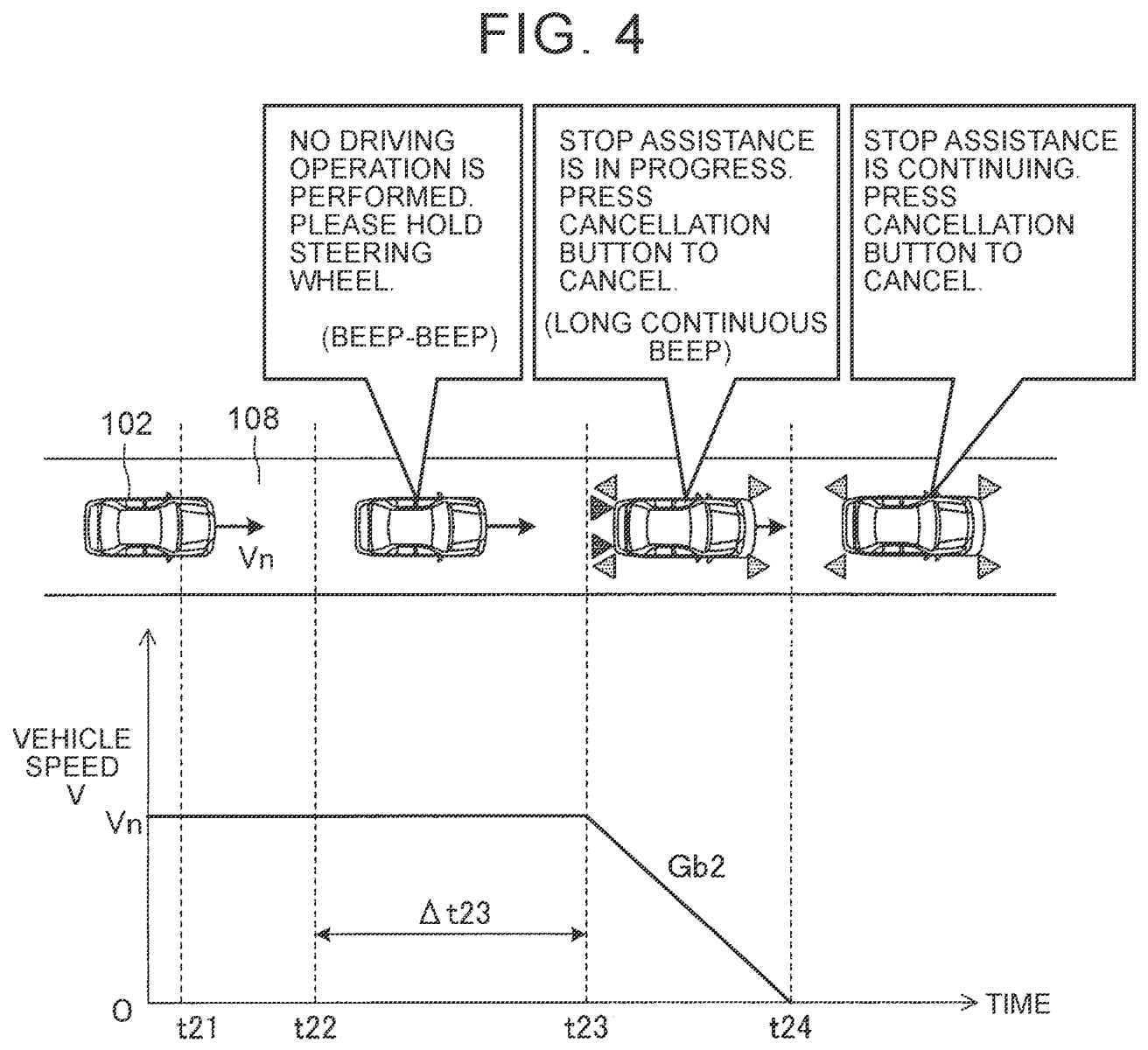

NO DRIVING OPERATION IS PERFORMED. PLEASE HOLD STEERING WHEEL.

(BEEP-BEEP)

STOP ASSISTANCE IS IN PROGRESS. PRESS CANCELLATION BUTTON TO CANCEL.

(LONG CONTINUOUS BEEP)

STOP ASSISTANCE IS CONTINUING. PRESS CANCELLATION BUTTON TO CANCEL.

102

108

$V_n$

VEHICLE SPEED V $V_n$

O t21    t22    t23    t24

$\Delta t23$

Gb2

TIME

VEHICLE AUTOMATIC DECELERATION CONTROL DEVICE

CROSS-REFERENCE TO RELATED APPLICATION

This application claims priority to Japanese Patent Application No. 2022-004379 filed on Jan. 14, 2022, incorporated herein by reference in its entirety.

BACKGROUND

1. Technical Field

The present disclosure relates to an automatic deceleration control device for a vehicle such as an automobile.

2. Description of Related Art

As one of driving assistance devices for vehicles such as automobiles, an automatic deceleration control device that automatically decelerates the vehicle and stops the vehicle without requiring a braking operation of a driver by controlling a brake device when it is determined that the vehicle needs to be decelerated and stopped is known.

For example, Japanese Unexamined Patent Application Publication No. 2017-190048 (JP 2017-190048 A) describes an automatic deceleration control device configured to automatically decelerate a vehicle to stop while providing steering assistance such that the vehicle travels in a lane when the driver is determined to be in an abnormal state in which the driver is unable to drive.

According to the automatic deceleration control device such as the automatic deceleration control device described in the above-mentioned publication, when the driver is in an abnormal state in which the driver is unable to drive, the vehicle is automatically decelerated and stopped while steering assistance is provided such that the vehicle travels in the lane. Therefore, it is possible to suppress the vehicle from continuing to travel in the state in which the driver is unable to drive.

SUMMARY

In general, the automatic deceleration control device of the related art, such as the automatic deceleration control device described in the above publication, is configured to automatically decelerate and stop the vehicle in a situation where the vehicle is traveling on a motorway. A deceleration for automatically decelerating the vehicle is set to a relatively moderate deceleration such that the driver can recover a state in which the driver is able to drive and can resume driving.

Even in a situation where the vehicle is traveling on a road other than a motorway (hereinafter referred to as a "general road"), the driver may experience an abnormal state in which the driver is unable to drive. Therefore, it is preferable that the vehicle be automatically decelerated and stopped by the automatic deceleration control device even when the driver becomes unable to drive in a situation where the vehicle is traveling on a general road.

However, on a general road, multiple vehicles often travel close to each other, and there are places such as intersections and railroad crossings where vehicles cannot be stopped. Therefore, the traveling environment of the vehicle on the general road is more complicated compared with the motorway. Accordingly, when the vehicle is automatically decelerated with relatively moderate deceleration, the vehicle needs to be decelerated while the steering assistance is provided in a situation where the vehicle is traveling in the complicated traveling environment. It is thus difficult to stop the vehicle where the vehicle can be stopped without imposing adverse effects on surroundings.

On the other hand, when the deceleration for the automatic deceleration is set to a relatively high deceleration suitable for automatic deceleration on the general road, the deceleration for the automatic deceleration in a situation where the vehicle is traveling on the motorway becomes excessive. Accordingly, the effect of deceleration on the following vehicle and the like becomes large, and it becomes difficult to take measures to return to driving when the driver recovers the state in which the driver is able to drive.

The present disclosure provides an automatic deceleration control device that is refined so as to allow the vehicle to be decelerated and stopped safely compared with the related art when the driver enters an abnormal state in which the driver is unable to drive, regardless of whether the vehicle is traveling on a motorway or a general road.

According to the present disclosure, a vehicle automatic deceleration control device (100) including a driver state detection device (driver imaging camera sensor 16) that detects a state of a driver and a control unit (driving assistance ECU 10) configured to automatically decelerate a vehicle at a predetermined deceleration to stop the vehicle (S40, S80) by controlling a brake device (32) when the driver state detection device detects that the driver is in a state in which the driver is unsuitable for driving (S10) is provided.

The control unit is configured to determine whether a road on which the vehicle (102) is traveling is a motorway (S20), set the predetermined deceleration to a first deceleration when the road is determined to be the motorway (S40), and set the predetermined deceleration to a second deceleration that is higher than the first deceleration when the road is determined not to be the motorway (S80).

With the configuration above, when the driver is detected to be unsuitable for driving, the vehicle is automatically decelerated at a predetermined deceleration and stopped by controlling the brake device. Whether a road on which the vehicle is traveling is a motorway is determined, the predetermined deceleration is set to a first deceleration when the road is determined to be the motorway, and the predetermined deceleration is set to a second deceleration that is higher than the first deceleration when the road is determined not to be the motorway.

Therefore, it is possible to increase the predetermined deceleration when the road is a general road other than the motorway without excessively increasing the predetermined deceleration when the road is a motorway. Accordingly, the vehicle can be decelerated and stopped safely compared with the related art when the driver enters an abnormal state in which the driver is unable to drive, regardless of whether the vehicle is traveling on a motorway or a general road.

Aspects of the Disclosure

According to an aspect of the present disclosure, the control unit (driving assistance ECU 10) is configured to increase the first deceleration from a minimum value to a maximum value (S40), and the second deceleration is larger than the maximum value (S80).

According to the aspect above, the first deceleration is increased from the minimum value to the maximum value. Therefore, it is possible to suppress the traveling distance of the vehicle from the start of the automatic deceleration to the stop of the vehicle from being excessively long without excessively increasing the deceleration in the initial stage of the automatic deceleration when the road is the motorway. Also, since the second deceleration is larger than the maximum value, the predetermined deceleration when the road is a general road can be set to a deceleration higher than the first deceleration.

According to another aspect of the present disclosure, the control unit (driving assistance ECU 10) is configured to, when the vehicle is automatically decelerated at the first deceleration, start blinking of a hazard lamp after the deceleration is started (S40), and when the vehicle is automatically decelerated at the second deceleration, start the blinking of the hazard lamp at a start of the deceleration or before the start of the deceleration (S80).

The vehicle speed when the vehicle travels on the motorway is higher than the vehicle speed when the vehicle travels on the general road, and the first deceleration is lower than the second deceleration. Therefore, it takes a long time and a long traveling distance until the vehicle stops after the vehicle speed drops when the vehicle travels on the motorway. According to the aspect above, when the vehicle is automatically decelerated at the first deceleration, the hazard lamp starts blinking after the deceleration starts. Therefore, it is possible to suppress blinking of the hazard lamp from starting excessively early within a fluctuation range of the vehicle speed when the vehicle travels on the motorway.

On the other hand, the vehicle speed when the vehicle travels on a general road is lower than the vehicle speed when the vehicle travels on a motorway. However, the second deceleration is higher than the first deceleration, and in many cases, on general roads, multiple vehicles travel close to each other. Therefore, when the vehicle is automatically decelerated while the vehicle is traveling on a general road, it is preferable that the hazard lamp start blinking early.

According to the aspect above, when the vehicle is automatically decelerated at the second deceleration, the hazard lamp starts blinking at or before the start of deceleration, that is, at the start of deceleration or before the start of deceleration. Therefore, it is possible to alert, without delay, the surroundings of the vehicle that the vehicle decelerates at or before the start of deceleration.

In the above description, in order to help understanding of the present disclosure, the names and/or the reference signs used in the embodiment are added in parentheses to the configurations of the disclosure corresponding to the embodiment to be described later. However, each component of the present disclosure is not limited to the component of the embodiment corresponding to the name and/or the symbol attached in parentheses. Other objects, other features and accompanying advantages of the present disclosure will be readily understood from the description of the embodiment of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram showing a specific example of automatic deceleration control on a motorway:

FIG. 4 is a diagram showing a specific example of the automatic deceleration control on a general road.

DETAILED DESCRIPTION OF EMBODIMENTS

Figure 1:
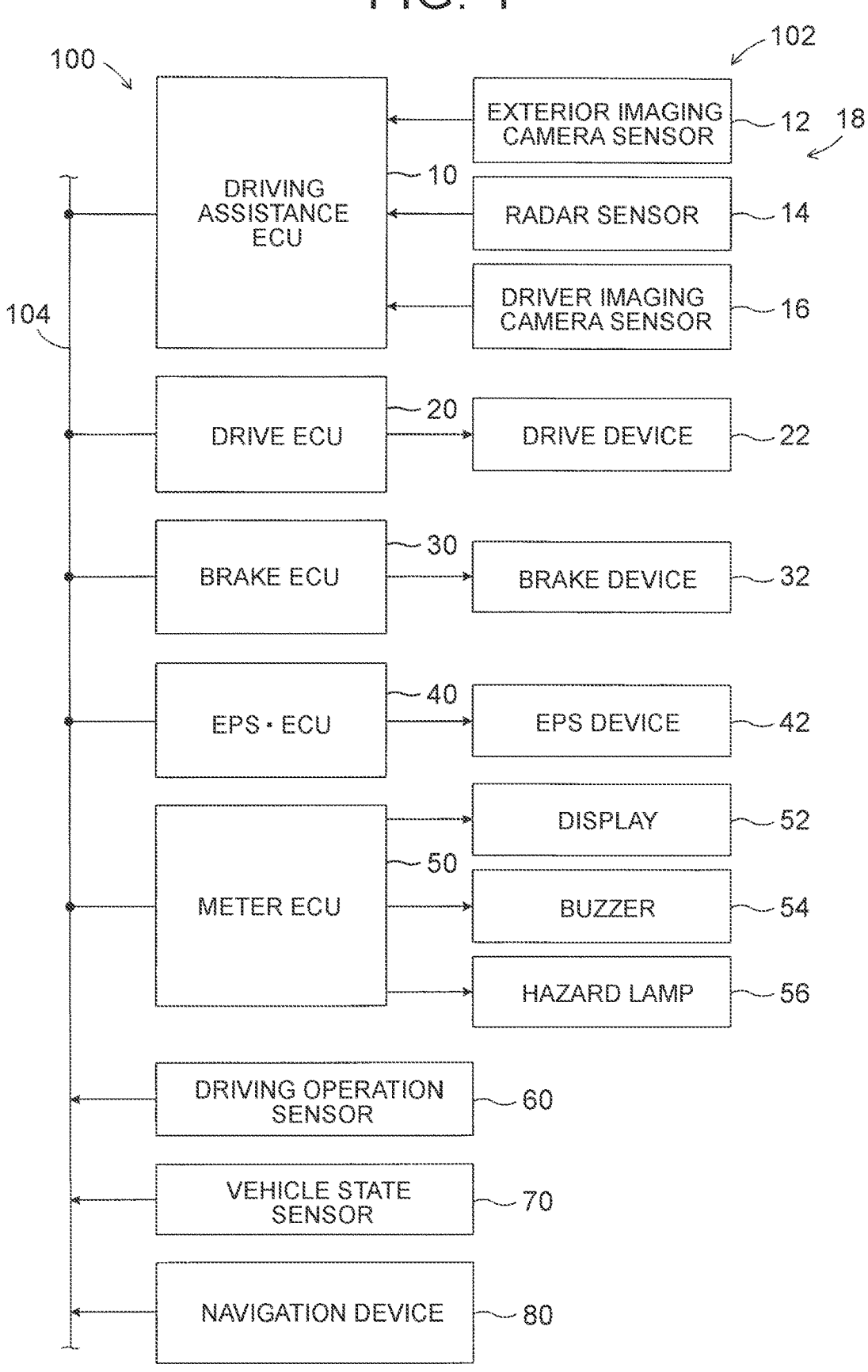
FIG. 1 is a schematic configuration diagram of an automatic deceleration control device according to an embodiment of the present disclosure.

An automatic deceleration control device according to an embodiment of the present disclosure will be described in detail with reference to the accompanying drawing.
Configuration As shown in FIG. 1, an automatic deceleration control device 100 according to the embodiment of the present disclosure is applied to a vehicle 102 and includes a driving assistance ECU 10. The vehicle 102 includes a drive ECU 20, a brake ECU 30, an electric power steering ECU 40, and a meter ECU 50. The ECU means an electronic control unit provided with a microcomputer as its main unit. Note that the electric power steering ECU is referred to as an EPS-ECU in the following description.

A microcomputer of each ECU includes a central processing unit (CPU), a read-only memory (ROM), a random access memory (RAM), a readable and writable non-volatile memory (N/M), an interface (I/F), and the like. The CPU realizes various functions by executing instructions (programs, routines) stored in the ROM. Further, these ECUs are connected to each other such that data is exchangeable (communicable) via a controller area network (CAN) 104. Therefore, detected values of sensors (including switches) connected to a specific ECU are transmitted to other ECUs as well.

The driving assistance ECU 10 is a central control device that executes driving assistance control such as adaptive cruise control and lane keeping control. In the embodiment, the driving assistance ECU 10 executes automatic deceleration control to decelerate and stop the vehicle 102 by automatic braking when the driver becomes unsuitable for driving, as will be described in detail later.

An exterior imaging camera sensor 12, a radar sensor 14, and a driver imaging camera sensor 16 are connected to the driving assistance ECU 10. The camera sensor 12 and radar sensor 14 each include a plurality of camera devices and a plurality of radar devices. The camera sensor 12 and the radar sensor 14 function as a surrounding information detection device 18 that detects information such as an object around the vehicle 102.

Although not shown in the drawing, each camera device of the exterior imaging camera sensor 12 includes a camera unit that captures an image of surroundings of the vehicle 102, and a recognition unit that analyzes image data obtained by capturing an image by the camera unit and recognizes objects such as white lines on the road and other vehicles. The recognition unit supplies information related to the recognized object to the driving assistance ECU 10 every time a predetermined time elapses. A light detection and ranging (LiDAR) may be used instead of the camera sensor 12.

Each radar device of the radar sensor 14 includes a radar transmission and reception unit and a signal processing unit (not shown), and the radar transmission and reception unit emits a radio wave in the millimeter wave band (hereinafter referred to as a "millimeter wave"), and receives a millimeter wave reflected by a three-dimensional object (for example, another vehicle, a bicycle, or a guard rail) that is present within a radiation range (that is, a reflected wave). The signal processing unit acquires information indicating a distance between a host vehicle and the three-dimensional object, a relative speed of the host vehicle with respect to the three-dimensional object, a relative position (direction) of the three-dimensional object with respect to the host vehicle, and the like based on a phase difference between the transmitted millimeter wave and the received reflected wave, an attenuation level of the reflected wave, the time from the transmission of the millimeter wave to the reception of the reflected wave, and the like every time a predetermined time elapses, and supplies the information to the driving assistance ECU 10.

The driver imaging camera sensor 16 is provided on a dashboard or a steering column (not shown in FIG. 1), and includes a camera unit that captures an image of an upper body of the driver, and an image processing unit that processes the image data of the upper body of the driver obtained by capturing the image of the upper body of the driver. The image processing unit supplies the information on the image data of the upper body of the driver to the driving assistance ECU 10 at predetermined time intervals. Therefore, the driver imaging camera sensor 16 functions as a driver monitor camera.

The CPU of the driving assistance ECU 10 calculates a degree of driving suitability Rd of the driver from the posture of the driver, the orientation of the face of the driver, the direction of the line of sight, the ratio of closing eyes of the driver per minute, and the state of eye opening, the frequency of blinking, eye movement, or the like, based on the information of the image data of the upper body of the driver.

The degree of driving suitability Rd is a degree indicating whether the driver is in a situation suitable for safe driving. When the degree of driving suitability Rd is less than a reference value Rdc (positive constant), the driver is determined to be in an abnormal state in which the driver is unable to drive safely. The degree of driving suitability Rd may be calculated by setting an evaluation value for each of the above items and summing the evaluation values. Further, when the degree of driving suitability is calculated, at least one of steering torque detected by a steering torque sensor to be described later, a grip pressure of the steering wheel gripped by the driver, and a pressing force on the armrest, a heart rate, myoelectric information, and an electroencephalogram pattern of the driver may be considered.

A drive device 22 that accelerates the vehicle 102 by applying a driving force to drive wheels (not shown in FIG. 1) is connected to the drive ECU 20. The drive ECU 20 normally controls the drive device 22 such that a driving force generated by the drive device 22 changes in accordance with a driving operation by the driver, and controls the drive device 22 based on a command signal when the drive ECU 20 receives the command signal from the driving assistance ECU 10.

In the embodiment, the drive device 22 includes an internal combustion engine, such as a gasoline engine, and a transmission, such as an automatic transmission, although the components are not shown in detail in FIG. 1. Note that, the drive device 22 is not limited to a combination of an internal combustion engine and a transmission. That is, as long as the drive device 22 generates the driving force for driving the vehicle 102, the drive device 22 may be any known drive device in the art such as a combination of an internal combustion engine and a continuously variable transmission, a so-called hybrid system that is a combination of an internal combustion engine and a motor, a so-called plug-in hybrid system, a combination of a fuel cell and a motor, and a motor.

A brake device 32 that decelerates the vehicle 102 by braking by applying a braking force to wheels that are not shown in FIG. 1 is connected to the brake ECU 30. The brake ECU 30 executes automatic braking in which the brake ECU 30 normally controls the brake device 32 such that a braking force generated by the brake device 32 changes in accordance with a braking operation by the driver, and controls the brake device 32 based on a command signal when the brake ECU 30 receives the command signal from the driving assistance ECU 10. When the braking force is applied to the wheels, a brake lamp (not shown in FIG. 1) is lit.

Furthermore, the brake device 32 according to the embodiment includes an electric parking brake actuator. An electric parking brake is abbreviated as EPB. Although not shown in FIG. 1, the EPB actuator activates the electric parking brake by activating a braking force generation device. When the parking brake is applied, the wheels are locked.

An EPS device 42 is connected to the EPS-ECU 40. The EPS-ECU 40 controls the steering assist torque by controlling the EPS device 42 in a manner known in the art based on steering torque Ts and a vehicle speed V detected by a driving operation sensor 60 and a vehicle state sensor 70 that will be described later, and reduces a steering load of the driver. Further, the EPS-ECU 40 can steer a steering wheel as needed by controlling the EPS device 42. Thus, the EPS-ECU 40 and the EPS device 42 constitute a steering device that automatically steers the steering wheel as needed.

A display 52 that displays the status of control by the driving assistance ECU 10, a buzzer 54 that sounds an alarming sound, and a hazard lamp 56 that notifies the surroundings of an abnormality that has occurred are connected to the meter ECU 50. The display 52 may be, for example, a head-up display or a multi-information display on which meters and various types of information are displayed, or may be a display of a navigation device.

The driving operation sensor 60 and the vehicle state sensor 70 are connected to the CAN 104. Information detected by the driving operation sensor 60 and the vehicle state sensor 70 (hereinafter referred to as sensor information) is transmitted to the CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 60 includes a drive operation amount sensor that detects an operation amount of an accelerator pedal, a braking operation amount sensor that detects a master cylinder pressure or a depression force applied to a brake pedal, and a brake switch that detects whether the brake pedal is operated. Furthermore, the driving operation sensor 60 includes a steering angle sensor that detects a steering angle θ, a steering torque sensor that detects the steering torque Ts, a shift position sensor that detects a shift position of a shift lever, and a driving assistance switch.

In the embodiment, the drive ECU 20 controls the shift range of the transmission in a shift-by-wire manner based on the shift position detected by the shift position sensor and based on the command from the driving assistance ECU 10. The driving assistance ECU 10 also executes driving assistance control such as automatic deceleration control and lane departure suppression control when the driver is in an abnormal state in the case where the driving assistance switch (not shown in FIG. 1) is turned on. Note that, the driving assistance switch includes a cancellation switch, and when the cancellation switch is pressed while automatic deceleration is being executed, the automatic deceleration is cancelled.

The lane departure suppression control is executed in a manner known in the art based on the lane detected by the surrounding information detection device 18 and the positional relationship of the vehicle 102 with respect to the lane such that the vehicle 102 does not deviate from the lane when a possibility that the vehicle 102 may deviate from the lane is determined. For example, the driving assistance ECU 10 controls the EPS device 42 via the EPS-ECU 40 such that the vehicle 102 does not deviate from the lane, and automatically steers the steering wheel without requiring the steering operation of the driver.

The vehicle state sensor 70 includes a vehicle speed sensor that detects the vehicle speed V of the vehicle 102, a longitudinal acceleration sensor that detects longitudinal acceleration of the vehicle 102, a lateral acceleration sensor that detects lateral acceleration of the vehicle 102, a yaw rate sensor that detects a yaw rate of the vehicle 102.

A navigation device 80 is connected to the CAN 104. The navigation device 80 includes a global positioning system (GPS) receiver that detects the position of the vehicle 102, a storage device that stores map information and road information, and a communication device that acquires the latest information of the map information and the road information from the outside. The road information includes information on types of roads, that is, information on motorways such as expressways, general roads, and the like. The navigation device 80 outputs information related to the type of road on which the vehicle 102 is traveling, in addition to information such as the position and traveling direction of the vehicle on the map, to the driving assistance ECU 10.

Figure 2:
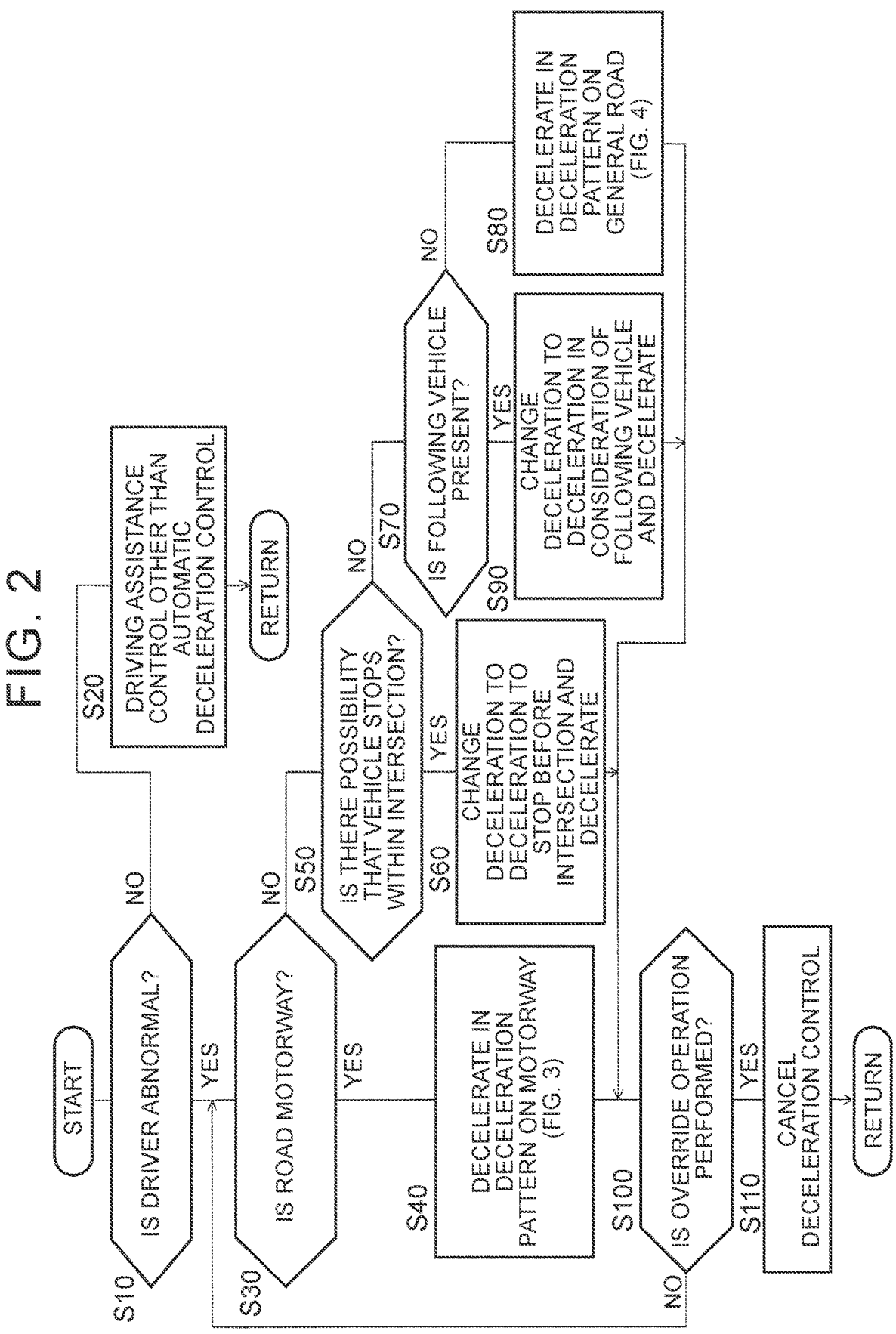
FIG. 2 is a flowchart showing an automatic deceleration control routine according to the embodiment.

In the embodiment, the ROM of the driving assistance ECU 10 stores a program for the automatic deceleration control corresponding to the flowchart shown in FIG. 2, and the CPU of the driving assistance ECU 10 executes the automatic deceleration control in accordance with the program.

Automatic Deceleration Control Routine in Embodiment

Next, an automatic deceleration control routine in the embodiment will be described with reference to the flowchart shown in FIG. 2. The automatic deceleration control according to the flowchart shown in FIG. 2 is executed by the CPU of the driving assistance ECU 10 when an ignition switch (not shown in FIG. 1) is turned on.

First, in step S10, the CPU calculates the degree of driving suitability Rd of the driver based on the information of the image data of the upper body of the driver acquired by the driver imaging camera sensor 16. Furthermore, the CPU determines whether the driver is in an abnormal state in which the driver is unable to drive safely based on a determination whether the degree of driving suitability Rd is determined to be less than the reference value Rdc is continuously made the reference number of times (positive constant integer) or more. When the CPU makes an affirmative determination, the CPU advances the automatic deceleration control to step S30, and when the CPU makes a negative determination, the CPU advances the automatic deceleration control to step S20.

In step S20, the CPU executes the driving assistance control other than the automatic deceleration control, for example, the lane departure suppression control.

In step S30, the CPU determines whether the road on which the vehicle 102 is currently traveling is a motorway based on information from the navigation device 80. When the CPU makes a negative determination, that is, when the CPU determines that the road is a general road, the CPU advances the automatic deceleration control to step S50, and when the CPU makes an affirmative determination, the CPU advances the automatic deceleration control to step S40.

The detection result of the exterior imaging camera sensor 12 and/or the detection result of the radar sensor 14 may be used to determine whether the road is a motorway and to determine whether there is an intersection in step S50 that will be described later. Furthermore, a combination of the information from the navigation device 80 and the detection result of the exterior imaging camera sensor 12 and/or the detection result of the radar sensor 14 may be used.

In step S40, the CPU outputs a deceleration command to the brake ECU 30 such that the vehicle 102 automatically decelerates until the vehicle 102 stops in a preset deceleration pattern on a motorway. A specific example of the deceleration pattern on the motorway will be described later with reference to FIG. 3.

In step S50, the CPU determines whether there is an intersection ahead of the vehicle 102 based on information from the navigation device 80. Further, the CPU determines whether there is a possibility that the vehicle 102 stops within the intersection when the vehicle 102 is decelerated in a deceleration pattern on a general road. When the CPU makes a negative determination, the CPU advances the automatic deceleration control to step S70, and when the CPU makes an affirmative determination, the CPU advances the automatic deceleration control to step S60.

In step S60, the CPU changes the deceleration pattern such that the vehicle 102 stops at a position before or past the intersection, and outputs the deceleration command to the brake ECU 30 such that the vehicle 102 decelerates in the changed deceleration pattern.

In step S70, the CPU determines whether a following vehicle is present behind the vehicle 102. When the CPU makes an affirmative determination, the CPU advances the automatic deceleration control to step S90, and when the CPU makes a negative determination, that is, the CPU determines that no following vehicle is present behind the vehicle 102, the CPU advances the automatic deceleration control to step S80.

In step S80, the CPU outputs a deceleration command to the brake ECU 30 such that the vehicle 102 decelerates in the deceleration pattern on the general road. A specific example of the deceleration pattern on the general road will be described later with reference to FIG. 4.

In step S90, the CPU changes the deceleration pattern such that the following vehicle does not collide with the vehicle 102, and outputs a deceleration command to the brake ECU 30 such that the vehicle 102 decelerates in the changed deceleration pattern.

In step S100, the CPU determines whether the driver has performed an override operation that overrides the automatic deceleration control. When the CPU makes a negative determination, the CPU returns the automatic deceleration control to step S30, and when the CPU makes an affirmative determination, that is, when the CPU determines that the driver becomes suitable for driving the vehicle 102, the CPU cancels the automatic deceleration control in step S110. Note that the override operation may be, for example, any of a braking and driving operation, a steering operation, or an operation of various switches. Specific Example of Deceleration Pattern on Motorway Next, with reference to FIG. 3, a specific example of the deceleration pattern on the motorway will be described. Note that, the deceleration pattern shown in FIG. 3 is an exemplary deceleration pattern, and the deceleration pattern on the motorway is not limited to the deceleration pattern shown in FIG. 3.

Figure 3:
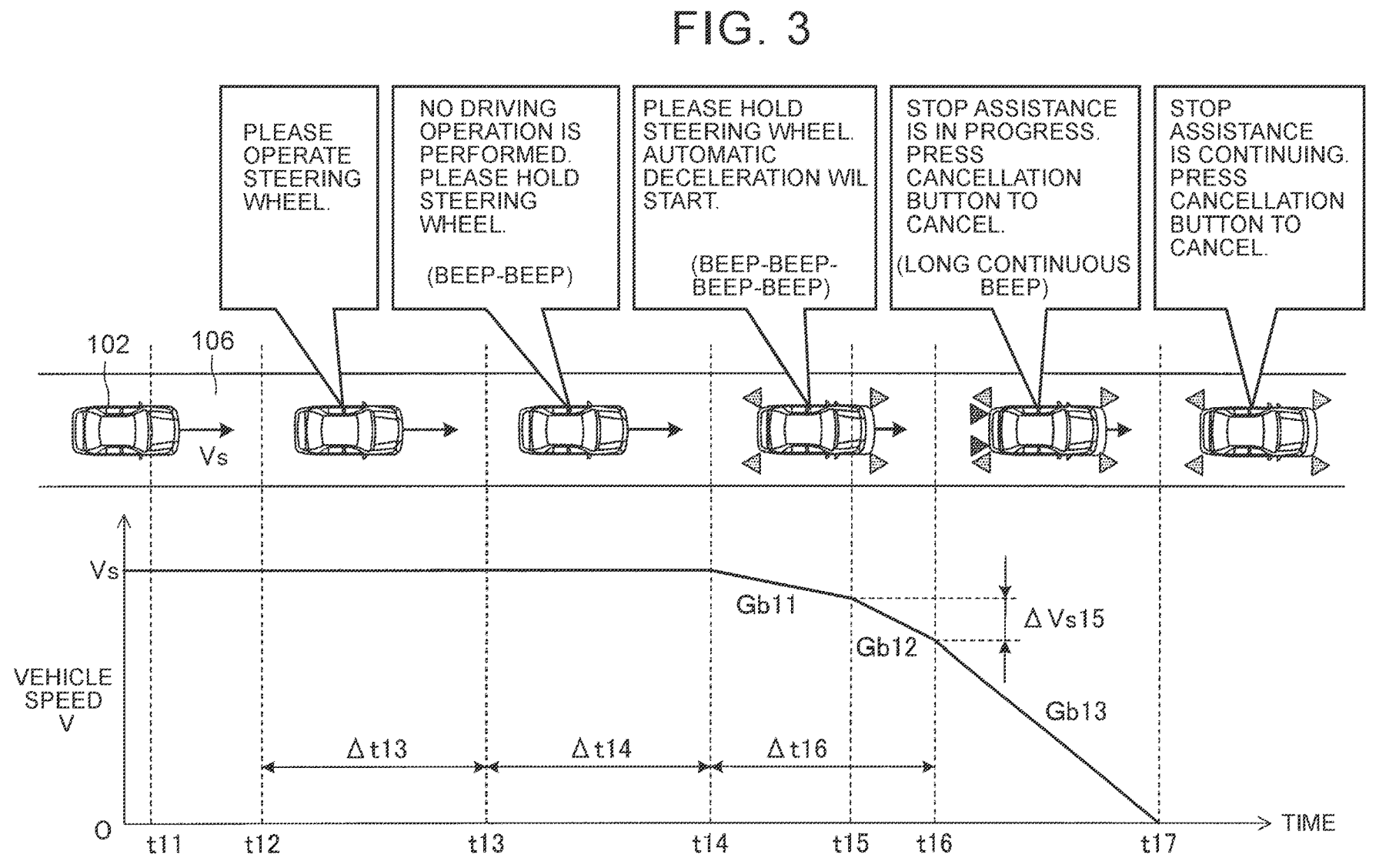

As shown in FIG. 3, it is assumed that the vehicle 102 is traveling on a motorway 106 at a vehicle speed Vs of 120 km/h, for example. Also, at time t11, the driver enters an abnormal state, and at time t12, the driver is determined to be is in an abnormal state (S10), and the road is determined to be a motorway (S30).

At time t12, the display 52 starts display of a warning on hand release such as "Please operate the steering wheel." At time t13 when time Δt13 (positive constant) has elapsed from time t12, sounding of the buzzer 54 such as "beep-beep" is started while the display on the display 52 is changed to a warning such as "No driving operation is performed. Please hold the steering wheel."

At time t14 when time Δt14 (positive constant) has elapsed from time t13, a first deceleration Gb1 is set to a first stage deceleration Gb11 (minimum value) of 0.05 g, for example, where g is a gravitational acceleration, and the automatic deceleration is started. In addition, sounding of the buzzer 54 is changed to a sound such as "beep-beep-beep-beep" while the display on the display 52 is changed to a warning such as "Please hold the steering wheel. Automatic deceleration will start."

At time t15 when the vehicle speed has decreased by a change amount ΔVs15 (positive constant) from the vehicle speed Vs at time t14, the first deceleration Gb1 is increased to a second stage deceleration Gb12 (intermediate value) of 0.07 g, for example. Also, the hazard lamp 56 starts blinking.

At time t16 when time Δt16 (positive constant) has elapsed from time t14, the first deceleration Gb1 is increased to a third stage deceleration Gb13 (maximum value) of 0.1 g, for example. In addition, sounding of the buzzer 54 is changed to a continuous sound such as a long continuous beep while the display on the display 52 is changed to a warning such as "Stop assistance is in progress. Press the cancellation switch to cancel." Further, the brake lamp (not shown in FIG. 1) starts to illuminate.

Note that each of the first to third decelerations Gb1 to Gb13 may be a preset constant. However, at least one of the first to third decelerations Gb1 to Gb13 may be set to be variable corresponding to the vehicle speed Vs so as to be larger as the vehicle speed Vs at the start of the automatic deceleration becomes higher.

At time t17, when the vehicle 102 has stopped, the brake lamp is turned off while the display on the display 52 is changed to a warning such as "Stop assistance is continuing. Press the cancellation switch to cancel." Further, the command signal is output to the drive ECU 20 to switch the shift range of the transmission to a parking (P) range, and the command signal is output to the brake ECU 30 to operate the electric parking brake.

Note that, although the lane departure suppression control continues after time t11, the lane departure suppression control ends at time t17. Further, when the vehicle 102 is capable of wireless communication with external facilities, at time t17, transmission of a relief request may be started by wireless communication.

Specific Example of Deceleration Pattern on General Road

Next, with reference to FIG. 4, a specific example of the deceleration pattern on the general road will be described. Note that, the deceleration pattern shown in FIG. 4 is an exemplary deceleration pattern, and the deceleration pattern on the general road is not limited to the deceleration pattern shown in FIG. 4.

As shown in FIG. 4, it is assumed that the vehicle 102 is traveling on a general road 108 at a vehicle speed Vn of 60 km/h, for example. Further, at time t21, the driver enters an abnormal state, and at time t22, the driver is determined to be is in an abnormal state (S10), and the road is determined to be a general road (S30).

At time t22, sounding of the buzzer 54 such as "beep-beep" is started while a display of a warning such as "No driving operation is performed. Please hold the steering wheel." is started on the display 52. Also, the hazard lamp 56 starts blinking at time t22, or during the period from time t22 to time t23 when time Δt23 (positive constant) elapses, or at time t23.

At time t23, a second deceleration Gb2 is set to a deceleration of 0.25 g, for example, and the automatic deceleration is started. In addition, sounding of the buzzer 54 is changed to a continuous sound such as a long continuous beep while the display on the display 52 is changed to a warning such as "Stop assistance is in progress. Press the cancellation switch to cancel." Furthermore, the brake lamp (not shown in FIG. 1) starts to illuminate, and a horn starts sounding.

Note that, the second deceleration Gb2 may be a preset constant regardless of the vehicle speed V of the vehicle 102. However, the second deceleration Gb2 may be set to be variable corresponding to the vehicle speed Vn so as to be larger as the vehicle speed Vn at the start of the automatic deceleration becomes higher.

At time t24, when the vehicle 102 has stopped, the brake lamp is turned off while the display on the display 52 is changed to a warning such as "Stop assistance is continuing. Press the cancellation switch to cancel." Further, the command signal is output to the drive ECU 20 to switch the shift range of the transmission to the P range, and the command signal is output to the brake ECU 30 to operate the electric parking brake.

Note that, although the lane departure suppression control continues after time t21, the lane departure suppression control ends at time t24. Further, when the vehicle 102 is capable of wireless communication with external facilities, at time t24, transmission of a relief request may be started by wireless communication.

As can be seen from the above description, according to the present embodiment, when the driver is detected to be unsuitable for driving (S10), the brake device 32 is controlled and the vehicle 102 is automatically decelerated at a predetermined deceleration and stopped (S40, S80). Whether the road on which the vehicle 102 is traveling is the motorway 106 is determined (S30). When the road is determined to be the motorway 106, the deceleration for the automatic deceleration is set to the first deceleration Gb1 (S40), and when the road is determined to be the general road 108, the deceleration for automatic deceleration is set to the second deceleration Gb2 that is higher than the first deceleration Gb1 (S80).

Therefore, it is possible to increase the deceleration for the automatic deceleration when the road is a general road without excessively increasing the deceleration for the automatic deceleration when the road is a motorway. Accordingly, the vehicle 102 can be decelerated and stopped safely compared with the related art when the driver enters an abnormal state in which the driver is unable to drive, regardless of whether the vehicle 102 is traveling on a motorway or a general road.

Further, according to the embodiment, the first deceleration Gb1 is increased in three steps from the first stage deceleration Gb11 that is the minimum value to the third stage deceleration Gb13 that is the maximum value. Therefore, it is possible to suppress the traveling distance of the vehicle 102 from the start of the automatic deceleration to the stop of the vehicle 102 from being excessively long without excessively increasing the deceleration in the initial stage of automatic deceleration when the road is the motorway 106. Also, since the second deceleration Gb2 is larger than the third stage deceleration Gb13, the deceleration for the automatic deceleration when the road is a general road can be set to a deceleration higher than the first deceleration Gb1.

Furthermore, according to the embodiment, when the vehicle 102 is automatically decelerated at the first deceleration Gb1, the hazard lamp 56 starts blinking after the deceleration starts. Therefore, it is possible to suppress blinking of the hazard lamp from starting excessively early within a fluctuation range of the vehicle speed when the vehicle travels on the motorway.

On the other hand, when the road is a general road and the vehicle is automatically decelerated at the second deceleration Gb2, the hazard lamp starts blinking at or before the start of deceleration, that is, at the start of deceleration or before the start of deceleration. Therefore, it is possible to alert, without delay, the surroundings of the vehicle that the vehicle decelerates at or before the start of deceleration.

In particular, according to the embodiment, when the road on which the vehicle 102 is currently traveling is determined to be a general road in step S30, whether there is a possibility that the vehicle stops within the intersection is determined in step S50. When a possibility that the vehicle may stop within the intersection is determined, the deceleration pattern is changed in step S60 such that the vehicle 102 stops at a position before or past the intersection. Therefore, it is possible to suppress the vehicle from stopping within the intersection when the vehicle 102 is automatically decelerated in a situation where there is an intersection in front of the vehicle 102.

Further, according to the embodiment, when the vehicle 102 is traveling on a general road, whether a following vehicle is present behind the vehicle 102 is determined in step S70. When the following vehicle is determined to be preset behind the vehicle 102, the deceleration pattern is changed in step S90 such that the following vehicle does not collide with the vehicle 102 from behind. Therefore, it is possible to reduce the possibility that the following vehicle collides with the vehicle 102 from behind.

Note that steps S50 and S60 or steps S70 and S90 may be omitted. Furthermore, the automatic deceleration control may proceed to step S80 when steps S50 to S70 and step S90 are omitted, and a negative determination is made in step S30.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the embodiment described above, when the road on which the vehicle 102 is traveling on the motorway 106, the first deceleration Gb1 is increased in three steps from the first stage deceleration Gb11 that is the minimum value to the third stage deceleration Gb13 that is the maximum value. However, the first deceleration Gb1 may be increased in multiple stages other than three stages, and the first deceleration Gb1 may be increased at least partially continuously.

In the embodiment described above, the second deceleration Gb2 when the road on which the vehicle 102 is traveling is the general road 108 is a constant value that is larger than the third stage deceleration Gb13 of the first deceleration Gb1. However, the second deceleration Gb2 may also be increased in multiple steps or at least partially continuously. Even in that case, the minimum value of the second deceleration Gb2 is set to a value larger than the maximum value of the first deceleration Gb1.

Further, in the embodiment described above, when an affirmative determination is made in step S50, the automatic deceleration control proceeds to step S60. However, when an affirmative determination is made in step S50, the same determination as in step S70 may be made, and when a negative determination is made, the automatic deceleration control may proceed to step S60. When an affirmative determination is made, the control similar to steps S60 and S90 may be executed. That is, the deceleration command may be output to the brake ECU 30 such that the deceleration pattern is changed so as to cause the vehicle 102 to stop at a position before or past the intersection and to avoid collision of the vehicle 102 with the following vehicle, and the vehicle 102 decelerates in the changed deceleration pattern.

Figure 5:
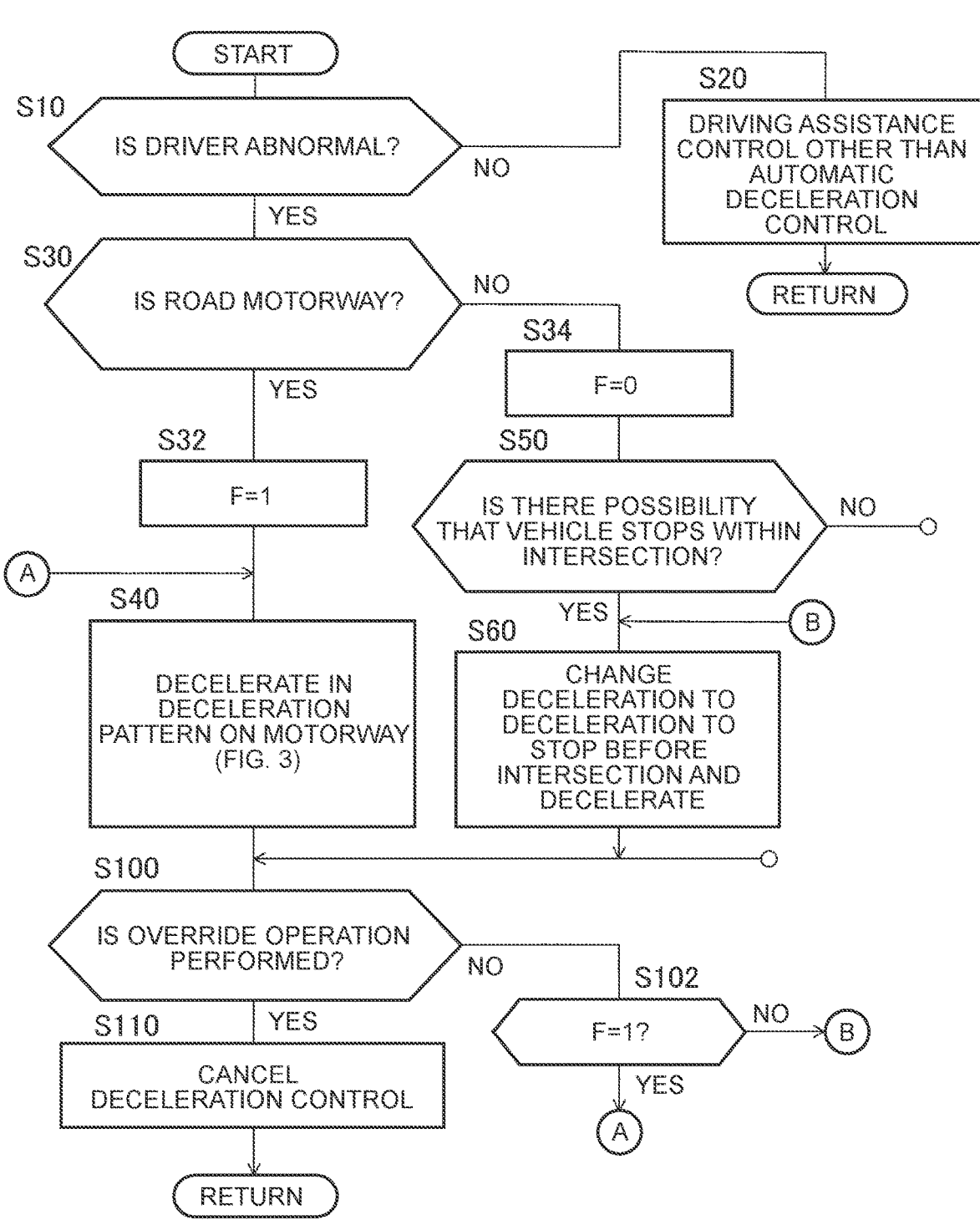
FIG. 5 is a flowchart showing essential portions of the automatic deceleration control routine in a modified example.

In the embodiment described above, whether the driver has performed the override operation that overrides the automatic deceleration control is determined in step S100, and when a negative determination is made, the automatic deceleration control is returned to step S30. However, as shown in FIG. 5 as a modified example, when an affirmative determination is made in step S30, a flag F may be set to 1 in step S32, and when a negative determination is made, the flag F may be set to 0 in step S34. Further, when a negative determination is made in step S100, whether the flag F is 1 may be determined in step S102. When an affirmative determination is made, the automatic deceleration control may be returned to step S40. When a negative determination is made, the automatic deceleration control may be returned to step S50. According to this modified example, it is possible to avoid execution of step S30 each time a negative determination is made in step S100.

What is claimed is:

1. A vehicle automatic deceleration control device including a driver state detection device that detects a state of a driver and a controller configured to automatically decelerate a vehicle at a predetermined deceleration to stop the vehicle by controlling a brake device when the driver state detection device detects that the driver is in a state in which the driver is unsuitable for driving, wherein the controller is configured to:

determine whether a road on which the vehicle is traveling is a motorway, set the predetermined deceleration to stop the vehicle to a first deceleration when the road is determined to be the motorway, and set the predetermined deceleration to stop the vehicle to a second deceleration that is higher than the first deceleration when the road is determined not to be the motorway, and wherein the controller is further configured to:

determine whether a following vehicle is present behind the vehicle when it is determined that the road on which the vehicle is traveling is determined not to be the motorway; and change a deceleration pattern of an automatic deceleration based on the predetermined deceleration when the following vehicle is determined to be present, compared to when the following vehicle is not present.

2. The vehicle automatic deceleration control device according to claim 1, wherein the controller is configured to increase the first deceleration from a minimum value to a maximum value, and the second deceleration is larger than the maximum value.

3. The vehicle automatic deceleration control device according to claim 1, wherein the controller is configured to, when the vehicle is automatically decelerated at the first deceleration, start blinking of a hazard lamp after the deceleration is started, and when the vehicle is automatically decelerated at the second deceleration, start the blinking of the hazard lamp at a start of the deceleration or before the start of deceleration.

\* \* \* \* \*